(12) United States Patent
Manoukis et al.

(10) Patent No.: US 9,150,167 B2
(45) Date of Patent: Oct. 6, 2015

(54) VEHICLE AUXILIARY LIGHT CONTROL UNIT

(71) Applicant: RB Distribution, Inc., Colmar, PA (US)

(72) Inventors: Dimitri Manoukis, Telford, PA (US); Jessica Dessino, Lansdale, PA (US)

(73) Assignee: RB Distribution, Inc., Colmar, PA (US)

( * ) Notice: Subject to any disclaimer, the term of this patent is extended or adjusted under 35 U.S.C. 154(b) by 0 days.

(21) Appl. No.: 14/068,716

(22) Filed: Oct. 31, 2013

(65) Prior Publication Data

US 2014/0159577 A1    Jun. 12, 2014

Related U.S. Application Data

(60) Provisional application No. 61/720,632, filed on Oct. 31, 2012.

(51) Int. Cl.
*B60R 16/02* (2006.01)

(52) U.S. Cl.
CPC ..................... *B60R 16/02* (2013.01)

(58) Field of Classification Search
USPC ............... 315/82, 83, 77, 291, 307, 308; 307/10.8, 10.1
See application file for complete search history.

(56) References Cited

U.S. PATENT DOCUMENTS 6,265,829 B1 * 7/2001 Perdec ........................... 315/82

\* cited by examiner

*Primary Examiner* — David H Vu
(74) *Attorney, Agent, or Firm* — Volpe and Koenig, P.C.

(57) ABSTRACT

A plug-in auxiliary headlight control unit (AHCU) repairs a damaged LCM and assures headlight performance. The plug-in AHCU contains an alternate lighting control circuitry, vehicle wiring harness connectors, LCM connectors, and a power relay, arranged on a chassis. The AHCU plugs into the failed LCM unit utilizing existing connectors for the vehicle's wiring harness. This arrangement places the AHCU in-line between the vehicle's wiring harness and the LCM.

13 Claims, 7 Drawing Sheets

VEHICLE AUXILIARY LIGHT CONTROL UNIT

CROSS REFERENCE TO RELATED APPLICATION

This application claims the benefit of U.S. Provisional Application No. 61/720,632 filed Oct. 31, 2012, the contents of which is hereby incorporated by reference herein.

BACKGROUND

Many modern vehicles have a Lighting Control Module (LCM) that is responsible for activating or deactivating vehicle lighting in one or more modes. In many instances, the LCM fails due to the occurrence of an over current condition. Frequently, an over current condition will cause a disabling failure in the power relay in the LCM that switches the vehicle's lights off and on. Owing to the nature of the problem, it is a necessary repair. However, the cost to replace a failed LCM can be prohibitive and a cost effective solution is needed.

SUMMARY

A plug-in auxiliary headlight control unit (AHCU) repairs a damaged LCM and assures headlight performance. The plug-in AHCU contains an alternate lighting control circuitry, vehicle wiring harness connectors, LCM connectors, and a power relay, arranged on a chassis. The AHCU plugs into the failed LCM unit utilizing existing connectors for the vehicle's wiring harness. This arrangement places the AHCU in-line between the vehicle's wiring harness and the LCM.

DETAILED DESCRIPTION OF THE PREFERRED EMBODIMENTS

This invention is described in the following description with reference to the Figures, in which like reference numbers represent the same or similar elements. While this invention is described in terms of modes for achieving this invention's objectives, it will be appreciated by those skilled in the art that variations may be accomplished in view of these teachings without deviating from the spirit or scope of the present invention. The embodiments and variations of the invention described herein, and/or shown in the drawings, are presented by way of example only and are not limiting as to the scope of the invention. Unless otherwise specifically stated, individual aspects and components of the invention may be omitted or modified, or may have substituted therefore known equivalents, or as yet unknown substitutes such as may be developed in the future or such as may be found to be acceptable substitutes in the future. The invention may also be modified for a variety of applications while remaining within the spirit and scope of the claimed invention, since the range of potential applications is great, and since it is intended that the present invention be adaptable to many such variations.

The present invention provides a cost effective, easily installed solution to repair a damaged Lighting Control Module (LCM) and assures headlight performance. The invention comprises a repair LCM or Auxiliary Headlight Control Unit (AHCU) unit that contains an alternate lighting control circuitry, vehicle wiring harness connectors, LCM connectors, and a power relay, arranged on a chassis. The AHCU plugs into the failed LCM unit utilizing existing LCM connectors intended for receiving the vehicle's wiring harness. The vehicle wiring harness, previously connected to the vehicle's LCM, plugs into the AHCU via connectors designed to receive the harness terminations. This arrangement places the AHCU in-line between the original equipment wiring harness and the LCM.

In operation, the AHCU preferably operates as a pass-through device that does not alter any signals transmitted through the vehicle wiring harness and transmits all signals through to the LCM. The AHCU can monitor certain ground signal transmitted through the harness, for example, "Autolamps On/Off" and "Head Lamps On/Off". In response to these signals, the power relay in the AHCU may transmit a signal to the LCM to switch the vehicle lights on or off as commanded.

Installation of the AHCU is far less expensive than replacing a failed LCM, and restores a vehicle equipped with an AHCU back to full operational capacity.

Figure 1:
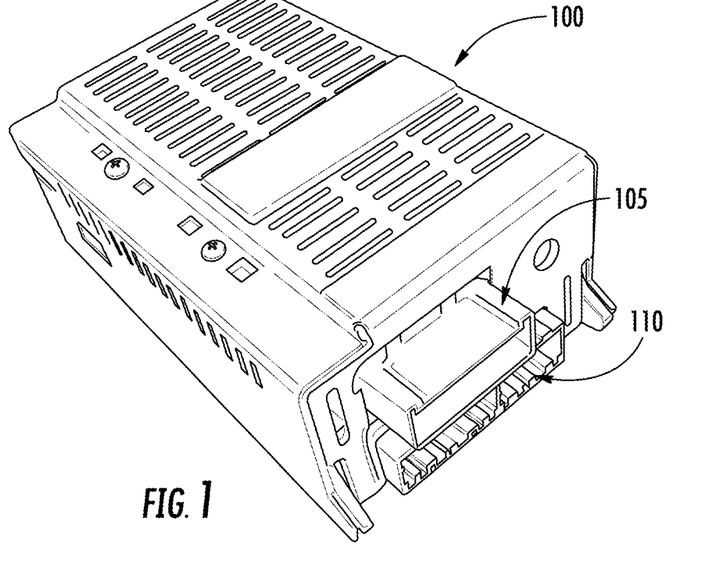
FIG. 1 is a perspective view of a Lighting Control Module (LCM)
Figure 2:
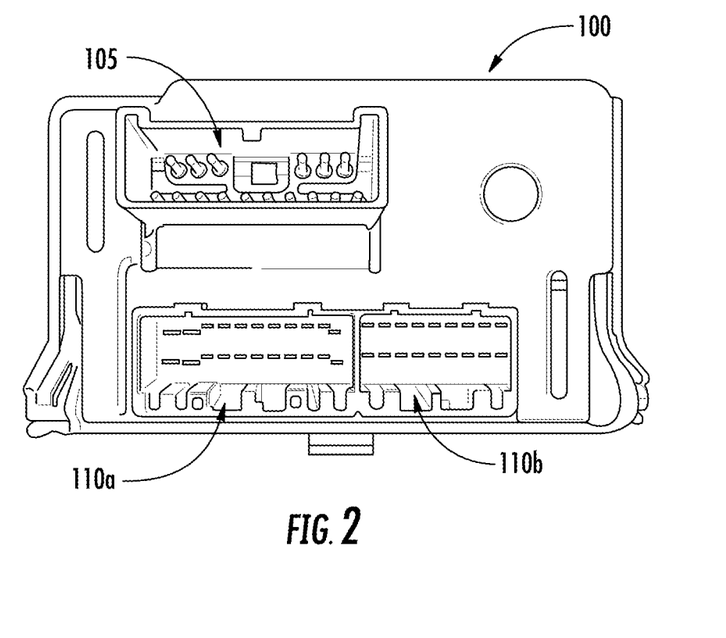
FIG. 2 is an end view of the LCM that illustrates the existing connection locations.

With reference to FIG. 1, the vehicle LCM 100 includes a first connector 105 and a second connector 110, that is segmented into two parts, 110(A) and 110(B), see FIG. 2.

Figure 3:
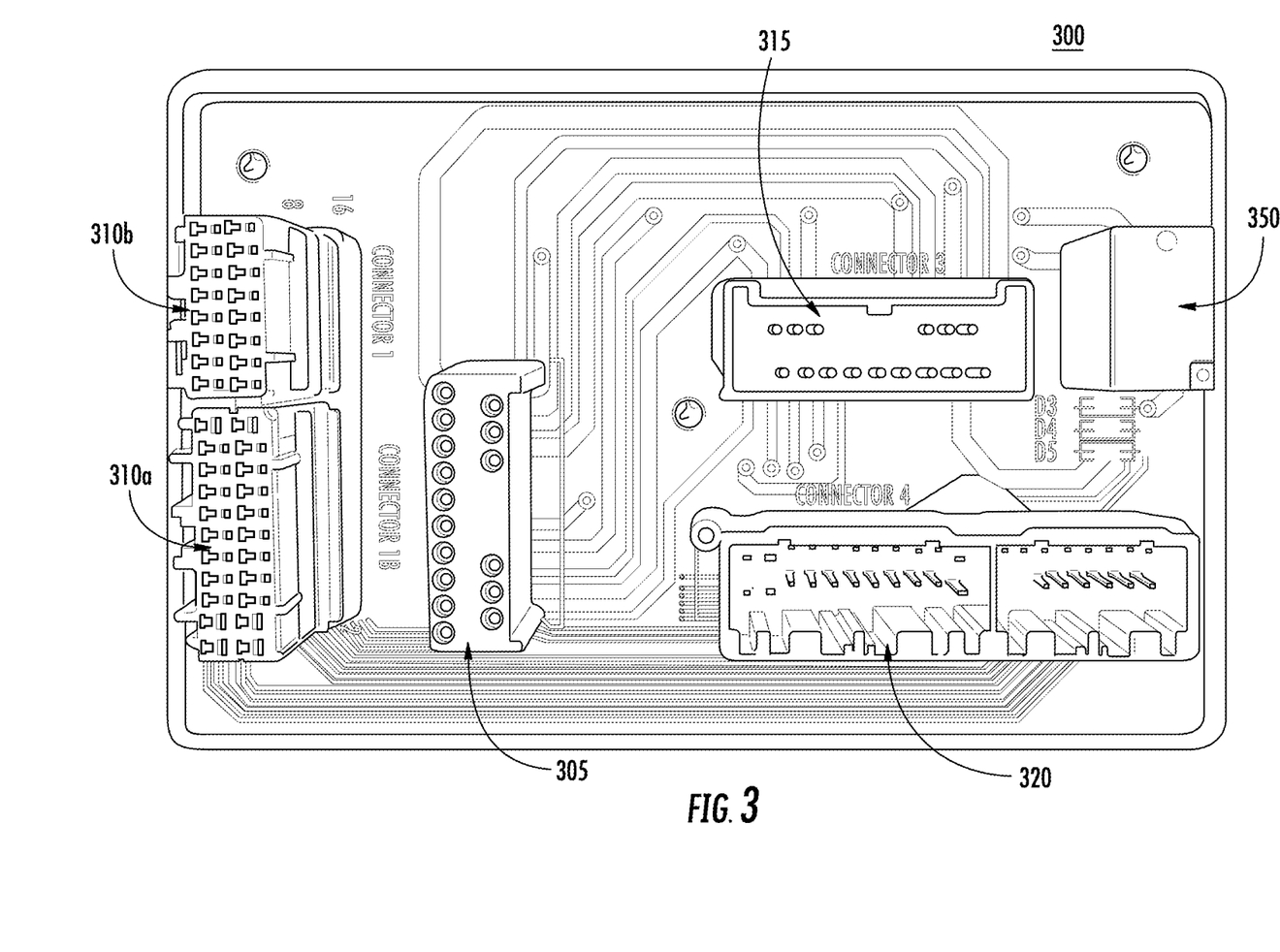
FIG. 3 is an example of a AHCU laid out on a circuit board.

With reference to FIG. 3, the AHCU 300 includes a first connector 305, a second connector 310, a third connector 315, a fourth connector 320, and a power relay 350. Second connector 310 is segmented into two parts, 310(A) and 310(B). First connector 305 and second connector 310, both 310(A) and 310(B), receive the first and second connectors of the LCM. Third connector 315 and fourth connector 420, receive the first and second connectors of the vehicle wiring harness. The power relay 350 is a headlight relay only. The power relay 350 replicates functionality of a failure prone relay in the LCM and assures headlight performance.

The AHCU 300 acts as a by-pass for a failure prone power relay in the LCM 100. The vehicle is unaware of the AHCU and continues to operate normally. The failure prone power relay in the LCM 100 is not removed. The power relay 350 of the AHCU 300 replicates the functionality of the failure prone relay in the LCM. The power relay 350 runs in conjunction with the failure prone relay, creating redundancy when the power relay in the LCM is functioning properly.

The power relay 350 in the AHCU 300 has a capacity of about 35 amps which is more robust than the typical relay in the LCM 100 which has a capacity of about 30 amps.

Connectors 305 and 315 may have 16 pins; each with a specific function. A first pin may provide battery voltage to the LCM and may also be used for switching voltage on relay 350. A second pin may provide voltage for vehicle interior lamps. A third pin may provide voltage for vehicle turning lamps. A fourth pin may provide voltage for vehicle exterior lamps and may supply voltage to a high side control coil of relay 350. A fifth pin may provide voltage for vehicle hazard lamps.

A sixth pin may provide voltage to power the LCM. A seventh pin may provide voltage for a vehicle rear flasher relay. An eighth pin may provide voltage for instrument cluster panel lighting. A ninth pin may provide voltage for vehicle door lock actuator. A tenth pin may be used as a ground. An eleventh pin may provide voltage for vehicle courtesy lamps. A twelfth pin may also provide voltage to power the LCM. A thirteenth pin may not be used. A fourteenth pin may provide voltage for a safety belt indicator. A fifteenth pin may also be used as a ground. A sixteenth pin may be used to provide voltage for vehicle head lamps. The voltage from the first pin may be switch to pin sixteen by relay 350.

Connector 310(a) may also have 16 pins; each with a specific function. A first pin may provide voltage when the vehicle is in Run or Accessory mode. A second pin may provide input to control vehicle instrument cluster panel illumination. A third pin may provide input to control key warning light and sound. A fourth pin may provide a door ajar indicator control signal. A fifth pin may provide a luggage compartment lid release solenoid control signal.

A sixth pin may not be used. A seventh pin may be used as a ground. An eighth pin may be used as a communication bun. A ninth pin may be used to provide voltage when the vehicle is in Start or Run mode. A tenth pin may be used to provide input to control headlamps on or off. The tenth pin may be grounded when the headlamps are on. The eleventh pin may also provide a door ajar indicator control signal. A twelfth pin may provide an illuminated entry signal. A thirteenth pin may be used to provide input to control parking lamps on or off. The thirteenth pin may be grounded when the parking lamps are on. The fourteenth pin may be used as a vehicle alarm control signal. A fifteenth pin may be sued as a wiper control signal. A sixteenth pin may also not be used.

Connector 310(b) may include 22 pins; each with a specific function. A first pin and second pin may not be used. A third pin may be used as a signal to monitor whether headlamps are on or off. A fourth pin may be used as a signal to control the horn relay. A fifth pin may be used to provide input from a vehicle speed sensor. A sixth pin may be used to provide input to control auto lamps on or off. The sixth pin may be grounded when the auto lamps are on. A seventh pin may be used as a single to control an auto lamps sun sensor. An eighth pin may also not be used. A ninth pin may be used as a signal to control the emergency warning flashers.

A tenth pin may be used as a door ajar indicator signal. An eleventh pin may be used as a left-front-door-open signal. A twelfth pin may be used as a rear window defrost relay control signal. A thirteenth pin may provide voltage for luggage compartment lamp. A fourteenth pin may be used as a signal to control the LCM audio chimes. A fifteenth pin may also not be used. A sixteenth pin may be used as a signal to control a headlamp dimmer switch. A seventeenth pin may be used as a signal to control air bag audio chimes. An eighteenth pin may provide input from the rear window defrost switch. Pins nineteen, twenty, and twenty-one may not be used. A twenty-second pin may provide output to control the driver door lock and unlock.

Connector 320 may have similar pins to connector pins to both 310(a) and 310(b).

Only five of the pins are used for the bypass function: pin 10 (used to provide input to control headlamps on or off) in Connector 310(a), pin 6 (used to provide input to control auto lamps on or off) in connector 310(b) and pins 1 (used to provide battery voltage to the LCM and may also be used for switching voltage on relay), 4 (used to provide voltage for vehicle exterior lamps and may supply voltage to a high side control coil of relay), and 16 (used to provide voltage for vehicle head lamps) in Connector 305. The remaining pins in the connectors are unused by the bypass module and the signals pass through the bypass module.

Figure 4:
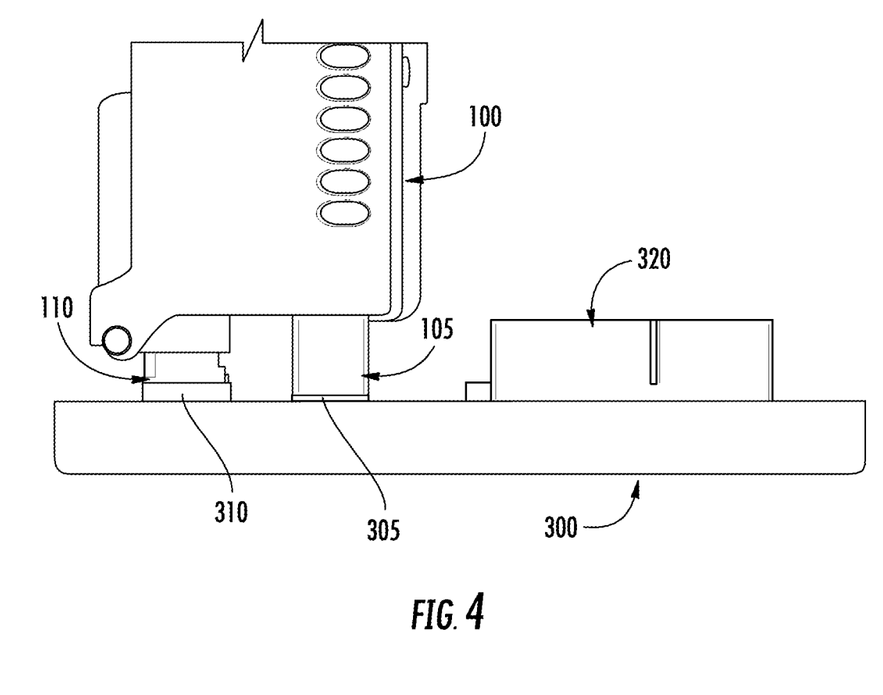
FIG. 4 illustrates the AHCU connected with the LCM.

FIG. 4 is an exemplary connection of the AHCU and the LCM. The AHCU 300 connects to the LCM 100 at the first connectors, 105 and 305, and second connectors, 110 and 310. First connector 105 of the LCM plugs into the first connector 305 of the AHCU. Second connector 110 of the LCM plugs into the second connector 310 of the AHCU.

Figure 5:
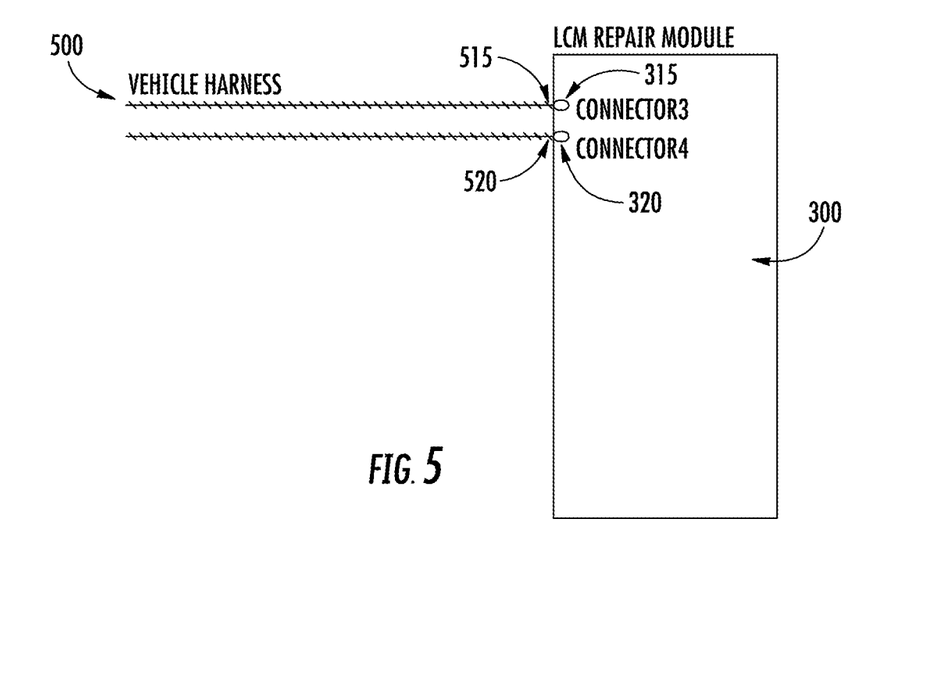
FIGS. 5 and 6 illustrate various connections with the vehicle wiring harness.

FIG. 5 is an exemplary connection of the AHCU and a vehicle wiring harness. The AHCU 300 connects to the vehicle wiring harness 500 at the third connectors, 315 and 515, and fourth connectors, 320 and 520. Third connector 515 of the vehicle wiring harness plugs into the third connector 315 of the AHCU. Fourth connector 520 of the vehicle wiring harness plugs into the fourth connector 320 of the AHCU.

Figure 6:
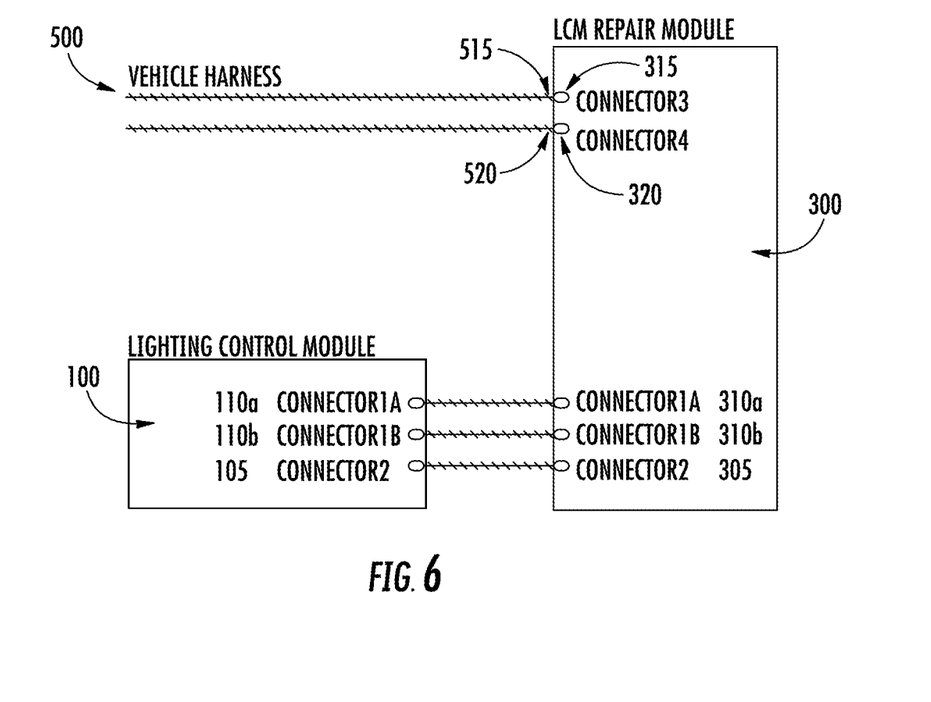

FIG. 6 is an exemplary connection of the AHCU to the LCM and the vehicle wiring harness. The AHCU 300 connects to the LCM 100 at connectors 1A, 1B, and 2 respectively. Connectors 1A (110(A)), 1B (110(B)), and 2 (105) of LCM 100 respectively connect to connectors 1A (310(A)), 1B (310(B)), and 2 (305) of the AHCU 300. The AHCU 300 also connects to the vehicle wiring harness 500 at connectors 3 and 4. Connectors 3 (515) and 4 (520) of the vehicle wiring harness 500 respectively connect to connectors 3 (315) and 4 (320) of the AHCU 300.

Figure 7A:
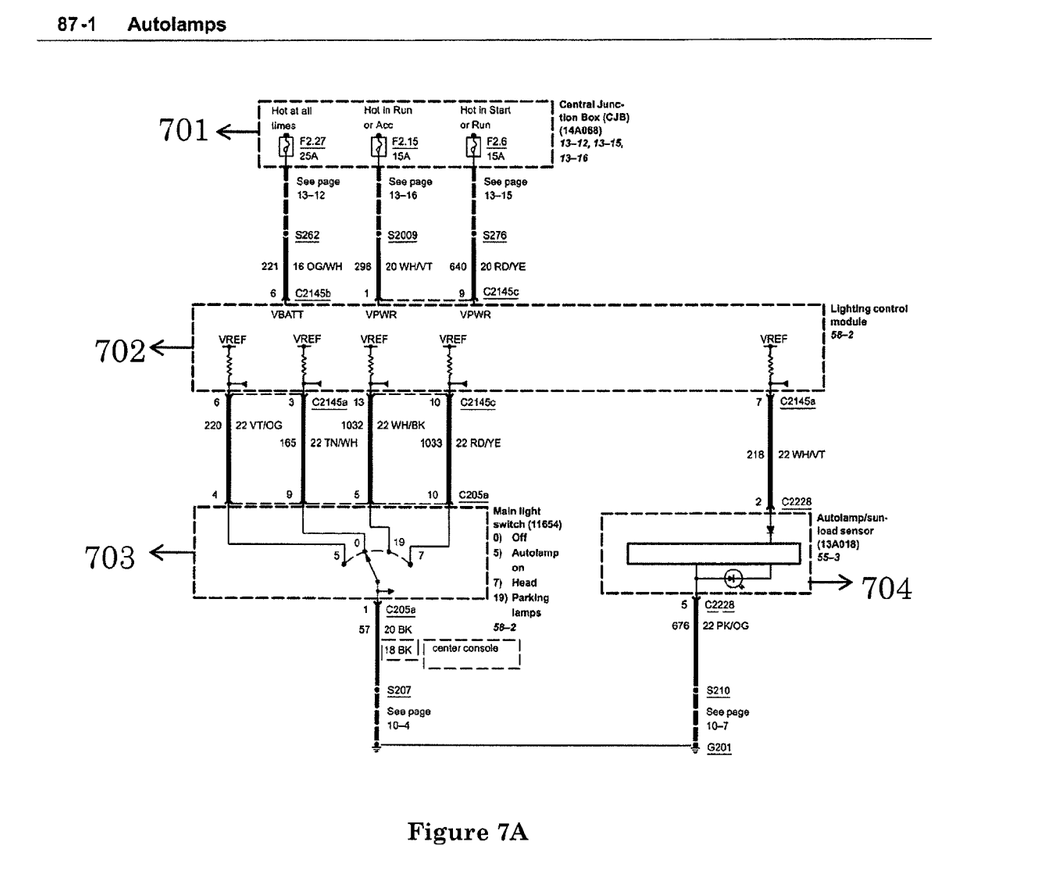
FIGS. 7A-7C are exemplary auto lamp circuits used in vehicles.
Figure 7B:
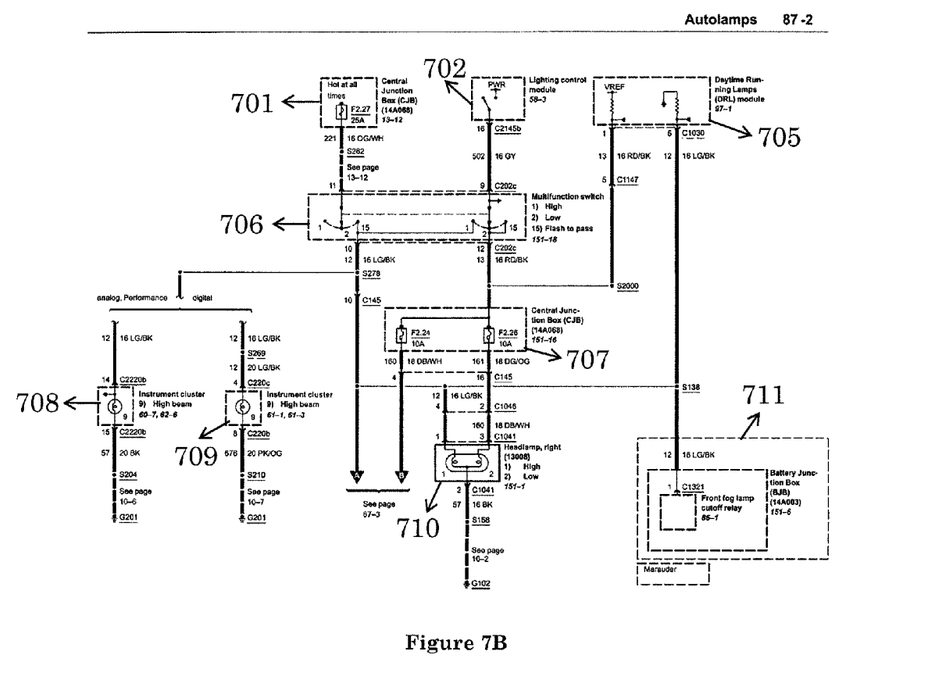
Figure 7C:
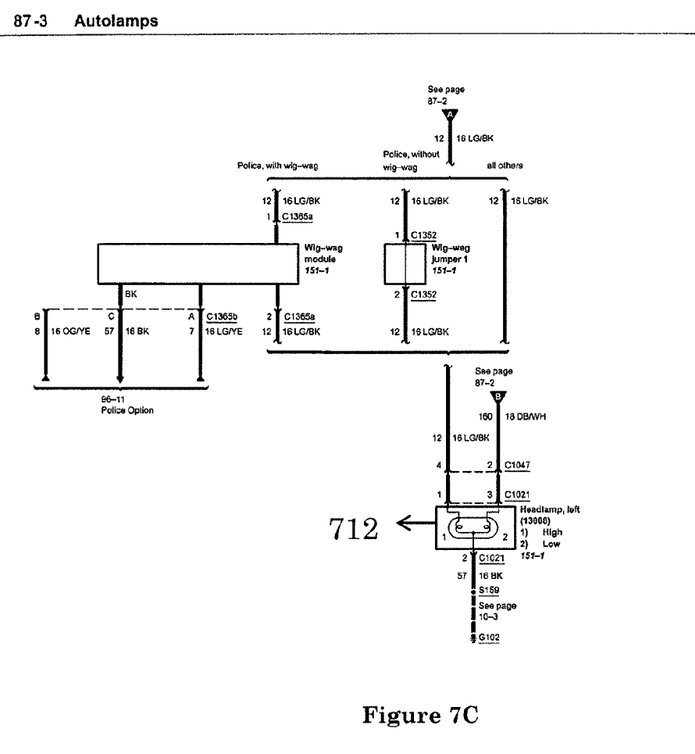

FIGS. 7A-7C illustrate known circuitry that is associated with vehicle lamps.

FIG. 7A illustrates a central junction box 701, the lighting control module 702, a main light switch 703, and an auto lamp/sun-load sensor 70. FIG. 7B illustrates a central junction box 701, the lighting control module 702, daytime running lamps module 705, a multifunction switch 706, a second central junction box 707, a first instrument cluster 708, a second instrument cluster 709, a right headlamp 710, and a battery junction box 711. FIG. 7C illustrates a left headlamp 712.

Those of ordinary skill in the art may recognize that many modifications and variations of the above may be implemented without departing from the spirit or scope of the following claims. Thus, it is intended that the following claims cover the modifications and variations provided they come within the scope of the appended claims and their equivalents.

What is claimed is:

1. An auxiliary headlight control unit (AHCU) that cooperates with a vehicle lighting module (LCM) to control the operation of the vehicle's headlights, the AHCU comprising:
   first and second connectors configured to connect to a vehicle's LCM in place of the vehicle's wiring harness connectors;
   third and fourth connectors configured to connect to a vehicle's wiring harness connectors; and,
   a circuit that includes a power relay in electrical contact with the vehicle's wiring harness.

2. AHCU of claim 1 wherein the power relay is a headlight relay.

3. The AHCU of claim 1 wherein the power relay has a capacity of 35 A.

4. The AHCU claim 1 wherein the AHCU operates in parallel with the LCM.

5. The AHCU of claim 1 wherein the power relay creates redundancy in combination with the LCM.

6. The AHCU of claim 1 wherein the power relay replicates the functionality of the LCM.

7. A method for using an auxiliary headlight control unit (AHCU) that cooperates with a vehicle lighting module (LCM) to control the operation of the vehicle's headlights, the method comprising:

connecting first and second connectors to a vehicle's LCM in place of the vehicle's wiring harness connectors;

connecting third and fourth connectors to a vehicle's wiring harness connectors; and electrically contacting a power relay with the vehicle's wiring harness.

8. The method of claim 7 wherein the power relay is a headlight relay.

9. The method of claim 7 wherein the power relay has a capacity of 35 A.

10. The method claim 7 wherein the AHCU operates in parallel with the LCM.

11. The method of claim 7 wherein the power relay creates redundancy in combination with the LCM.

12. The method of claim 7 wherein the power relay replicates the functionality of the LCM.

13. An auxiliary headlight control unit (AHCU) that is configured to connect with a vehicle's wiring harness and assume operational control of the vehicle's lights, the AHCU comprising:

a plurality of connectors that are configured to connect to a vehicle's light control module (LCM) as a replacement for the vehicle's existing wiring harness connectors;

a plurality of connectors that are configured to connect to a vehicle's existing light control module (LCM) wiring harness connectors; and, a circuit that includes a power relay in electrical contact with the vehicle's existing wiring harness;

whereby the AHCU replaces the LCM in operation of the vehicle's lights.

* * * * *